US012476926B2

(12) United States Patent
Flag et al.

(10) Patent No.: US 12,476,926 B2
(45) Date of Patent: Nov. 18, 2025

(54) SERIAL CONSOLE TRANSPORT OFFLOAD WITH SMART NETWORK INTERFACE CONTROLLER

(71) Applicant: Dell Products L.P., Round Rock, TX (US)

(72) Inventors: Zhang Flag, Shanghai (CN); Peng Jia, Shanghai (CN); Joan Jun Xiong, Shanghai (CN); YungChin Fang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 402 days.

(21) Appl. No.: 17/584,917

(22) Filed: Jan. 26, 2022

(65) Prior Publication Data
US 2023/0300089 A1  Sep. 21, 2023

(51) Int. Cl.
*H04L 49/354* (2022.01)
*H04L 49/50* (2022.01)

(52) U.S. Cl.
CPC ............ *H04L 49/354* (2013.01); *H04L 49/50* (2013.01)

(58) Field of Classification Search
CPC ............................. H04L 49/50; H04L 49/354
See application file for complete search history.

(56) References Cited

U.S. PATENT DOCUMENTS

| | | | | |
|---|---|---|---|---|
| 2008/0282017 A1* | 11/2008 | Carpenter | ........... | G06F 13/4291 710/316 |
| 2013/0283093 A1* | 10/2013 | Ramamurthy | ...... | H04L 41/0654 714/4.1 |
| 2016/0127171 A1* | 5/2016 | Kutch | ...................... | H04L 67/10 709/223 |
| 2018/0314277 A1* | 11/2018 | Moore | .................... | G05B 15/02 |
| 2020/0203898 A1* | 6/2020 | Butcher | .................. | H04L 49/15 |
| 2022/0210229 A1* | 6/2022 | Maddukuri | ........... | G06F 9/3877 |
| 2022/0335563 A1* | 10/2022 | Elzur | ........................ | G06T 1/60 |
| 2023/0015979 A1* | 1/2023 | Luo | .......................... | G06F 3/067 |

* cited by examiner

*Primary Examiner* — Huy D Vu
*Assistant Examiner* — Bao G Nguyen
(74) *Attorney, Agent, or Firm* — Jackson Walker L.L.P.

(57) ABSTRACT

An information handling system may include a host system, a management controller configured to provide out-of-band management of the information handling system, and a network interface including a network interface processor. The information handling system may be configured to: transmit serial console data from the host system to the network interface; store the serial console data in onboard storage of the network interface; and execute, at the network interface processor, a management agent configured to provide access to the serial console data from a remote information handling system.

15 Claims, 3 Drawing Sheets

SERIAL CONSOLE TRANSPORT OFFLOAD WITH SMART NETWORK INTERFACE CONTROLLER

TECHNICAL FIELD

The present disclosure relates in general to information handling systems, and more particularly to methods and systems for offloading serial console transport from a management controller to a smart network interface controller.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some computing applications, an information handling system may include a hypervisor for hosting one or more virtual resources such as virtual machines (VMs). A hypervisor may comprise software and/or firmware generally operable to allow multiple virtual machines and/or operating systems to run on a single information handling system at the same time. This operability is generally allowed via virtualization, a technique for hiding the physical characteristics of computing system resources (e.g., physical hardware of the computing system) from the way in which other systems, applications, or end users interact with those resources. Thus, a virtual machine may comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

In other applications, an information handling system may be used in a "bare metal" configuration in which only one operating system is installed, and the hypervisor and virtual resources are not needed.

In either scenario, a network interface of the information handling system may comprise a smart network interface card or "SmartNIC" and/or a data processing unit (DPU), which may offer capabilities not found in traditional NICs. For purposes of this disclosure, the terms "SmartNIC" and "DPU" may be used interchangeably.

Some information handling systems which are coupled to a local-area network (LAN) may employ a technology referred to as Serial Over LAN (SOL). SOL enables the input and output of the system's serial port to be redirected over the network (e.g., via Internet Protocol (IP)) instead of taking place via the physical serial COM port.

In some embodiments, a management controller such as a baseboard management controller (BMC) may allow a managed system's serial data (e.g., text-based console data) to be redirected over the management controller's dedicated or shared out-of-band management network.

However, the performance and stability of such BMC-based SOL may be less than ideal. BMC-based SOL typically requires a long-lasting and stable connection between the BMC and a management server, and so this approach can be impacted by network instability. Further, BMC-based SOL typically uses the BMC's memory as a cache, and so if the BMC receives a large volume of serial data from the host, the performance of the BMC with respect to its other functionality can be negatively impacted.

Accordingly, embodiments of this disclosure may allow for offloading some or all of the SOL functionality to a SmartNIC.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with existing serial transport within an information handling system may be reduced or eliminated.

In accordance with embodiments of the present disclosure, an information handling system may include a host system, a management controller configured to provide out-of-band management of the information handling system, and a network k interface including a network interface processor. The information handling system may be configured to: transmit serial console data from the host system to the network interface; store the serial console data in onboard storage of the network interface; and execute, at the network interface processor, a management agent configured to provide access to the serial console data from a remote information handling system.

In accordance with these and other embodiments of the present disclosure, a method may include transmitting serial console data from a host system of an information handling system to a network interface of the information handling system, the network interface including a network interface processor; storing the serial console data in onboard storage of the network interface; and executing, at the network interface processor, a management agent configured to provide access to the serial console data from a remote information handling system.

In accordance with these and other embodiments of the present disclosure, an article of manufacture may include a non-transitory, computer-readable medium having instructions thereon that are executable by at least one processor of an information handling system for: transmitting serial console data from a host system of the information handling system to a network interface of the information handling system, the network interface including a network interface processor; storing the serial console data in onboard storage of the network interface; and executing, at the network interface processor, a management agent configured to provide access to the serial console data from a remote information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
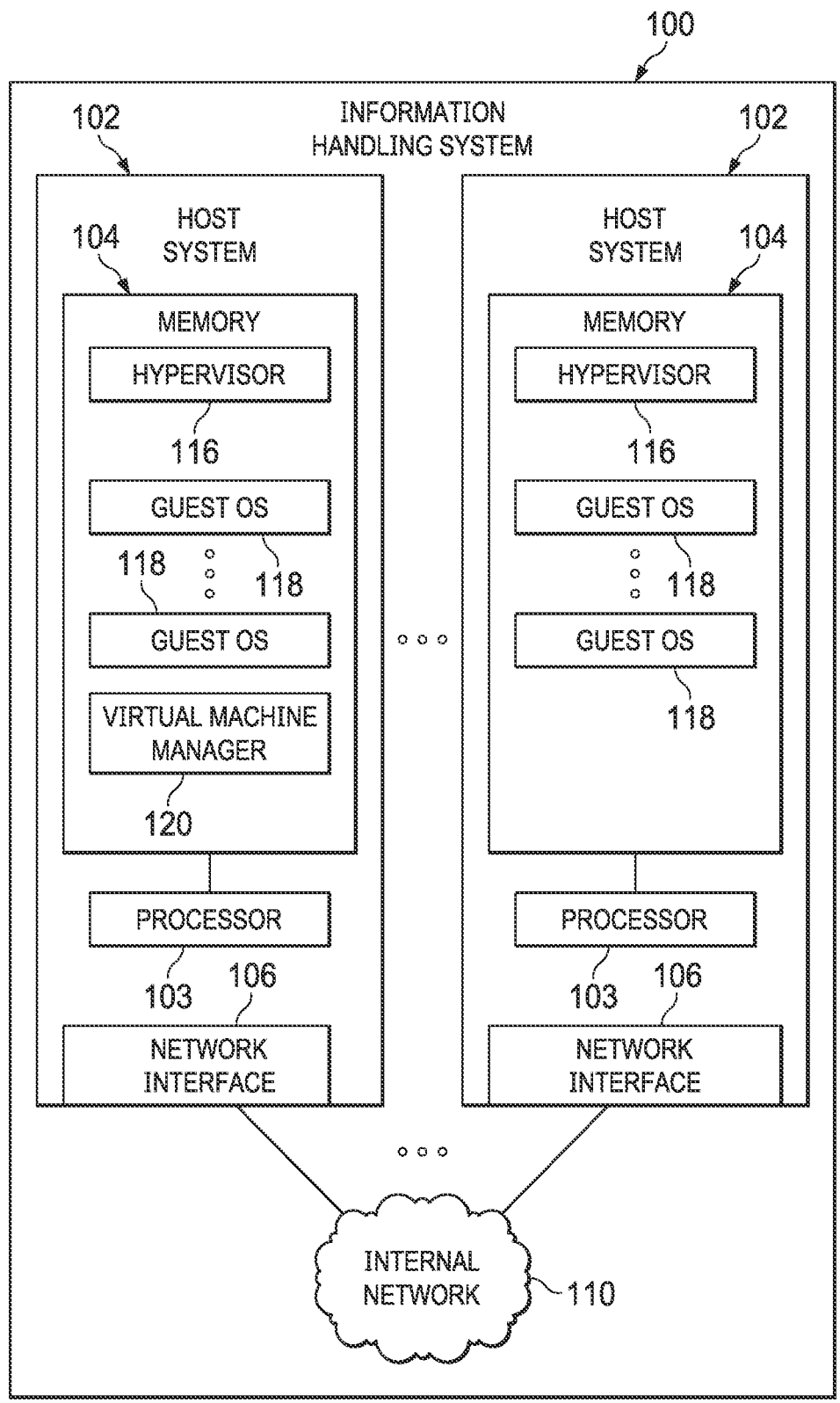
FIG. 1 illustrates a block diagram of selected components of an example information handling system, in accordance with embodiments of the present disclosure.
Figure 2:
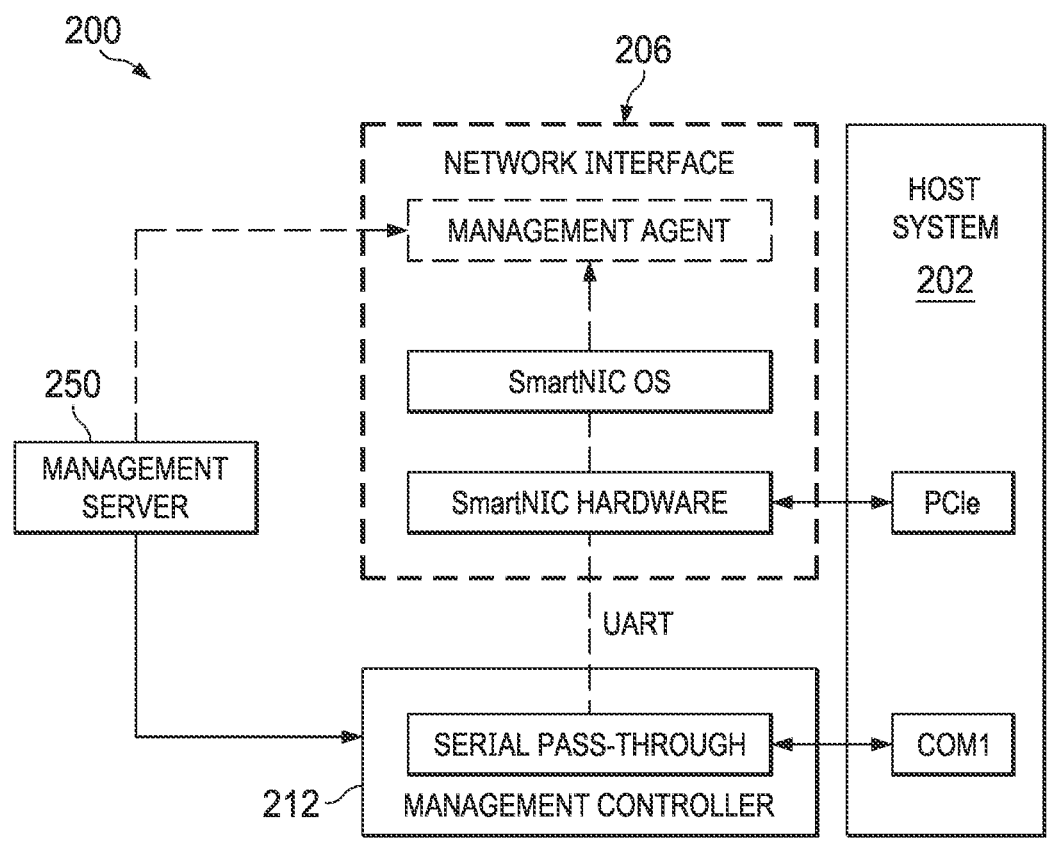
FIG. 2 illustrates a block diagram of selected components of an example information handling system, in accordance with embodiments of the present disclosure.
Figure 3:
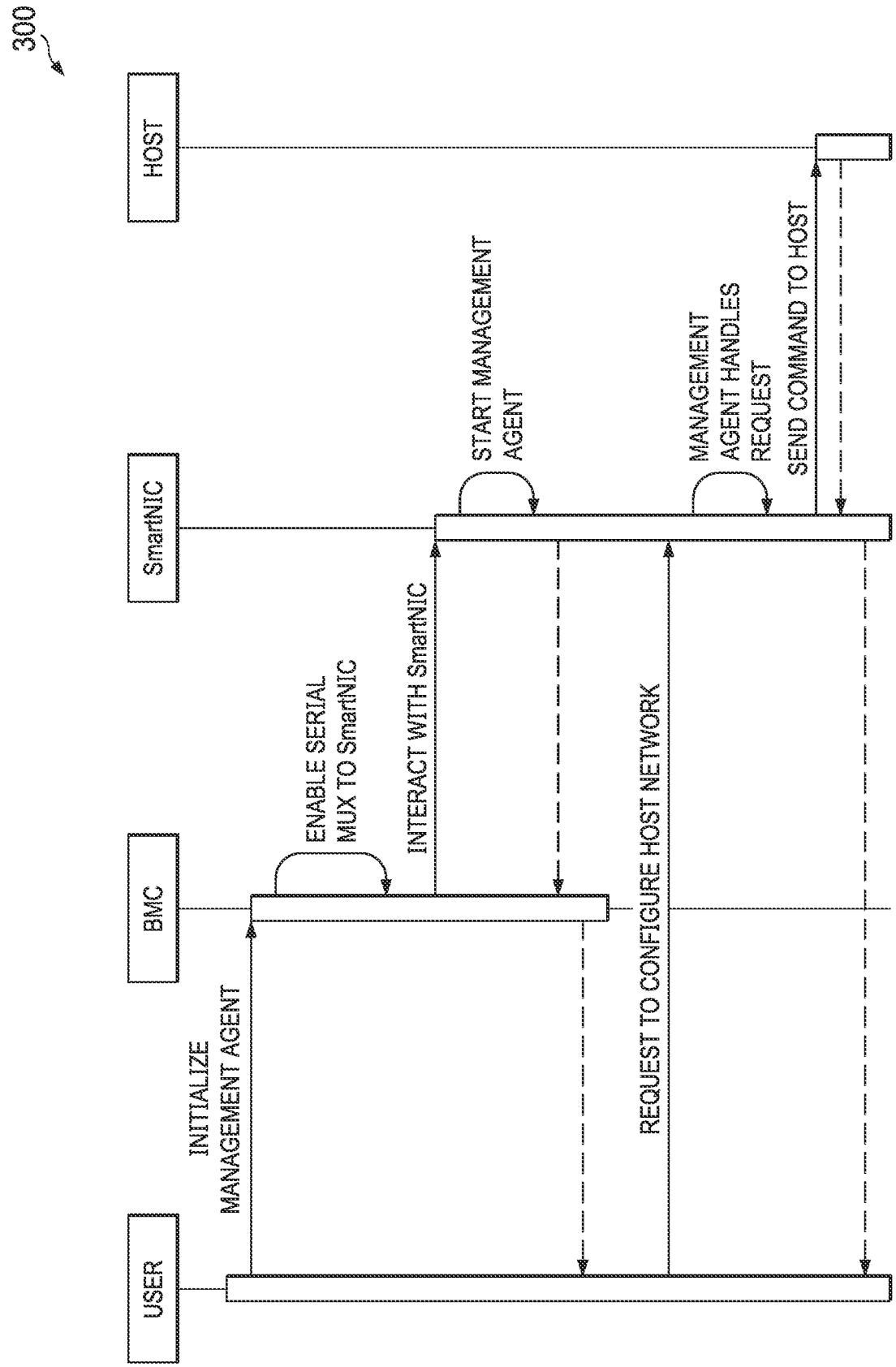
FIG. 3 illustrates an example sequence diagram, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or carriers; and/or any optical combination of the foregoing. Physical computer-readable media such as disk drives, solid-state drives, non-volatile memory, etc. may also be referred to herein as "physical storage resources."

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram selected components of an example information handling system 100 having a plurality of host systems 102, in accordance with embodiments of the present disclosure. As shown in FIG. 1, information handling system 100 may include a plurality of host systems 102 coupled to one another via an internal network 110.

In some embodiments, information handling system 100 may include a single chassis housing a plurality of host systems 102. In other embodiments, information handling system 100 may include a cluster of multiple chassis, each with one or more host systems 102. In yet other embodiments, host systems 102 may be entirely separate information handling systems, and they may be coupled together via an internal network or an external network such as the Internet.

In some embodiments, a host system 102 may comprise a server (e.g., embodied in a "sled" form factor). In these and other embodiments, a host system 102 may comprise a personal computer. In other embodiments, a host system 102 may be a portable computing device (e.g., a laptop, notebook, tablet, handheld, smart phone, personal digital assistant, etc.). As depicted in FIG. 1, information handling system 100 may include a processor 103, a memory 104 communicatively coupled to processor 103, and a network interface 106 communicatively coupled to processor 103. For the purposes of clarity and exposition, in FIG. 1, each host system 102 is shown as comprising only a single processor 103, single memory 104, and single network interface 106. However, a host system 102 may comprise any suitable number of processors 103, memories 104, and network interfaces 106.

A processor 103 may include any system, device, or apparatus configured to interpret and/or execute program instructions and/or process data, and may include, without digital limitation, a microprocessor, microcontroller, signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in a memory 104 and/or other computer-readable media accessible to processor 103.

A memory 104 may be communicatively coupled to a processor 103 and may include any system, device, or apparatus configured to retain program instructions and/or data for a period of time (e.g., computer-readable media). A memory 104 may include RAM, EEPROM, a PCMCIA card, flash memory, magnetic storage, opto-magnetic storage, or any suitable selection and/or array of volatile or non-volatile memory that retains data after power to information handling system 100 is turned off.

As shown in FIG. 1, a memory 104 may have stored thereon a hypervisor 116 and one or more guest operating systems (OS) 118. In some embodiments, hypervisor 116 and one or more of guest OSes 118 may be stored in a computer-readable medium (e.g., a local or remote hard disk drive) other than a memory 104 which is accessible to processor 103. Each guest OS 118 may also be referred to as a "virtual machine."

A hypervisor 116 may comprise software and/or firmware generally operable to allow multiple virtual machines and/or operating systems to run on a single computing system (e.g., an information handling system 100) at the same time. This operability is generally allowed via virtualization, a technique for hiding the physical characteristics of computing system resources (e.g., physical hardware of the computing system) from the way in which other systems, applications, or end users interact with those resources. A hypervisor 116 may be one of a variety of proprietary and/or commercially available virtualization platforms, including without limitation, VIRTUALLOGIX VLX FOR EMBEDDED SYSTEMS, IBM's Z/VM, XEN, ORACLE VM, VMWARE's ESX SERVER, L4 MICROKERNEL, TRANGO, MICROSOFT'S HYPER-V, SUN'S LOGICAL DOMAINS, HITACHI'S VIRTAGE, KVM, VMWARE SERVER, VMWARE WORKSTATION, VMWARE FUSION, QEMU, MICROSOFT'S VIRTUAL PC and VIRTUAL SERVER, INNOTEK'S VIRTUALBOX, and SWSOFT'S PARALLELS WORKSTATION and PARALLELS DESKTOP.

In one embodiment, a hypervisor 116 may comprise a specially-designed OS with native virtualization capabilities. In another embodiment, a hypervisor 116 may comprise a standard OS with an incorporated virtualization component for performing virtualization.

In another embodiment, a hypervisor 116 may comprise a standard OS running alongside a separate virtualization application. In this embodiment, the virtualization application of the hypervisor 116 may be an application running above the OS and interacting with computing system resources only through the OS. Alternatively, the virtualization application of a hypervisor 116 may, on some levels, interact indirectly with computing system resources via the OS, and, on other levels, interact directly with computing system resources (e.g., similar to the way the OS interacts directly with computing system resources, or as firmware running on computing system resources). As a further alternative, the virtualization application of a hypervisor 116 may, on all levels, interact directly with computing system resources (e.g., similar to the way the OS interacts directly with computing system resources, or as firmware running on computing system resources) without utilizing the OS, although still interacting with the OS to coordinate use of computing system resources.

As stated above, a hypervisor 116 may instantiate one or more virtual machines. A virtual machine may comprise any program of executable instructions, or aggregation of programs of executable instructions, configured to execute a guest OS 118 in order to act through or in connection with a hypervisor 116 to manage and/or control the allocation and usage of hardware resources such as memory, CPU time, disk space, and input and output devices, and provide an interface between such hardware resources and application programs hosted by the guest OS 118. In some embodiments, a guest OS 118 may be a general-purpose OS such as WINDOWS or LINUX, for example. In other embodiments, a guest OS 118 may comprise a specific- and/or limited-purpose OS, configured so as to perform application-specific functionality (e.g., persistent storage).

At least one host system 102 in information handling system 100 may have stored within its memory 104 a virtual machine manager 120. A virtual machine manager 120 may comprise software and/or firmware generally operable to manage individual hypervisors 116 and the guest OSes 118 instantiated on each hypervisor 116, including controlling migration of guest OSes 118 between hypervisors 116. Although FIG. 1 shows virtual machine manager 120 instantiated on a host system 102 on which a hypervisor 116 is also instantiated, in some embodiments virtual machine manager 120 may be instantiated on a dedicated host system 102 within information handling system 100, or a host system 102 of another information handling system 100.

A network interface 106 may include any suitable system, apparatus, or device operable to serve as an interface between an associated information handling system 100 and internal network 110. A network interface 106 may enable its associated information handling system 100 to communicate with internal network 110 using any suitable transmission protocol (e.g., TCP/IP) and/or standard (e.g., IEEE 802.11, Wi-Fi). In certain embodiments, a network interface 106 may include a physical network interface card (NIC). In the same or alternative embodiments, a network interface 106 may be configured to communicate via wireless transmissions. In the same or alternative embodiments, a network interface 106 may provide physical access to a networking medium and/or provide a low-level addressing system (e.g., through the use of Media Access Control addresses). In some embodiments, a network interface 106 may be implemented as a local area network ("LAN") on motherboard ("LOM") interface. A network interface 106 may comprise one or more suitable NICs, including without limitation, mezzanine cards, network daughter cards, etc.

In some embodiments, a network interface 106 may comprise a SmartNIC and/or a DPU. In addition to the stateful and custom offloads a SmartNIC or DPU may provide, it may have an independent management domain with a separate operating system, independent credentials, and independent remote access. Accordingly, network interface 106 may include its own specialized processor and memory.

In addition to processor 103, memory 104, and network interface 106, a host system 102 may include one or more other information handling resources.

Internal network 110 may be a network and/or fabric configured to communicatively couple information handling systems to each other. In certain embodiments, internal network 110 may include a communication infrastructure, which provides physical connections, and a management layer, which organizes the physical connections of host systems 102 and other devices coupled to internal network 110. Internal network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Internal network 110 may transmit data using any storage and/or communication protocol, including without limitation, Fibre Channel, Fibre Channel over Ethernet (FCOE), Small Computer System Interface (SCSI), Internet SCSI (iSCSI), Frame Relay, Ethernet Asynchronous Transfer Mode (ATM), Internet protocol (IP), or other packet-based protocol, and/or any combination thereof. Network 110 and its various components may be implemented using hardware, software, or any combination thereof.

Turning now to FIG. 2, a block diagram of selected components of an information handling system 200 is shown, according to some embodiments. Information handling system 200 may include host system 202 and management controller 212. Host system 202 may also include or be communicatively coupled to network interface 206, which may be a SmartNIC in some embodiments. Host system 202 may be coupled to the hardware of network interface 206 via a communication channel such as Peripheral Component Interconnect Express (PCIe) in some embodiments.

Management server 250 is a remote information handling system that is used to provide various management functionality for information handling system 200. While it is possible for management server 250 to communicatively couple to management controller 212 for serial console transport to receive serial data from host system 202, in the embodiment shown, some or all of the serial console transport functionality has been offloaded to network interface 206. Thus some or all of the computing workload for the SOL logic may be handled by network interface 206.

A management agent executing on network interface 206 may process and encapsulate the serial console data from host system 202. This data may be stored in onboard storage of network interface 206 and made available to management server 250 (e.g., via a RESTful application programming interface (API) or any other suitable mechanism). Accordingly, the performance, stability, and security of information handling system 200 may be increased, particularly in bare-metal scenarios. Further, this arrangement may prevent an unencrypted serial console stream from being exposed on the network, as communications between management server 250 and the management agent may be encrypted. Network interface 206 may also protect access via username and password credentials (e.g., the same credentials that are used by management controller 212 in one embodiment).

Management controller 212 may include a serial pass-through component such as a serial multiplexer (MUX), which may be configured to provide access to one or more than one serial data stream. The serial pass-through may be software controlled, allowing the serial port data (either unidirectional or bidirectional) to be redirected from management controller 212 to network interface 206 for storage and provisioning to management server 250.

Turning now to FIG. 3, a sequence diagram flow chart is shown of an example method 300 for offloading serial console transport to a network interface, in accordance with some embodiments.

As shown, a user may first transmit a command (e.g., via a management server such as management server 250) to the BMC to cause it to initialize the SmartNIC's management agent. This command may be transmitted to the BMC via an out-of-band management network or an in-band data network in various embodiments.

The BMC may then enable its serial MUX (or serial pass-through) functionality to allow the host system's COM port to communicate directly with the SmartNIC. The BMC may then cause the SmartNIC to start its management agent, allowing serial communication with the host via the SmartNIC.

The user may then use this serial SmartNIC communication channel to configure the host network or carry out any other desired management tasks. In these and other embodiments, the user may also use the serial SmartNIC communication channel to receive any logging messages or the like which the host system sends via its serial port.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1 and/or FIG. 2), and/or any other system operable to implement the method.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112 (f) for that claim element. Accordingly, none of the claims in this application as filed are intended to be interpreted as having means-plus-function elements. Should Applicant wish to invoke § 112 (f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, should be understood that various changes, substitutions, and alterations could be made hereto without departing from the spirit and scope of the disclosure.

What is claimed is:

1. An information handling system comprising:
    a host system including a serial port;
    a management controller configured to provide out-of-band management of the information handling system; and
    a network interface including a network interface processor;
    wherein the information handling system is configured to:
    transmit serial console data from the host system to the network interface, wherein the serial console data is transmitted from the serial port of the host system to the network interface via a serial pass-through of the management controller;
    store the serial console data in onboard storage of the network interface; and
    execute, at the network interface processor, a management agent configured to implement an application programming interface (API) that provides access to the serial console data from a remote information handling system.

2. The information handling system of claim 1, wherein the network interface is a SmartNIC.

3. The information handling system of claim 1, wherein the management controller is a baseboard management controller (BMC).

4. The information handling system of claim 1, wherein the serial pass-through is a serial multiplexer.

5. The information handling system of claim 1, wherein the management agent is further configured to provide bidirectional serial communication between the host system and the remote information handling system.

6. A method comprising:
    transmitting serial console data from a host system of an information handling system to a network interface of the information handling system, the network interface including a network interface processor, wherein the serial console data is transmitted from a serial port of the host system to the network interface via a serial pass-through of the management controller;
    storing the serial console data in onboard storage of the network interface; and
    executing, at the network interface processor, a management agent configured to implement an application programming interface (API) that provides access to the serial console data from a remote information handling system.

7. The method of claim 6, wherein the network interface is a SmartNIC.

8. The method of claim 6, wherein the management controller is a baseboard management controller (BMC).

9. The method of claim 6, wherein the serial pass-through is a serial multiplexer.

10. The method of claim 8, wherein the data is reconstructed at a different physical storage resource.

11. An article of manufacture comprising a non-transitory, computer-readable medium having instructions thereon that are executable by at least one processor of an information handling system for:
    transmitting serial console data from a host system of the information handling system to a network interface of the information handling system, the network interface including a network interface processor, wherein the serial console data is transmitted from a serial port of the host system to the network interface via a serial pass-through of the management controller;
    storing the serial console data in onboard storage of the network interface; and
    executing, at the network interface processor, a management agent configured to implement an application programming interface (API) that provides access to the serial console data from a remote information handling system.

12. The article of claim 11, wherein the network interface is a SmartNIC.

13. The article of claim 11, wherein the management controller is a baseboard management controller (BMC).

14. The article of claim 11, wherein the serial pass-through is a serial multiplexer.

15. The article of claim 11, wherein the management agent is further configured to provide bidirectional serial communication between the host system and the remote information handling system.

* * * * *